US012293556B2

United States Patent
Su

(10) Patent No.: US 12,293,556 B2
(45) Date of Patent: May 6, 2025

(54) METHOD AND A DEVICE FOR ASSIGNING A BOUNDING BOX TO AN OBJECT

(71) Applicant: Aptiv Technologies AG, Schaffhausen (CH)

(72) Inventor: Yu Su, Wuppertal (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 496 days.

(21) Appl. No.: 17/655,064

(22) Filed: Mar. 16, 2022

(65) Prior Publication Data

US 2022/0309760 A1  Sep. 29, 2022

(30) Foreign Application Priority Data

Mar. 23, 2021 (EP) ..................... 21164367

(51) Int. Cl.
*G06V 10/25* (2022.01)
*G06T 7/11* (2017.01)
(Continued)

(52) U.S. Cl.
CPC ............... *G06V 10/25* (2022.01); *G06T 7/11* (2017.01); *G06V 10/457* (2022.01);
(Continued)

(58) Field of Classification Search
CPC .... G06V 10/25; G06V 10/457; G06V 10/762; G06V 20/56; G06V 2201/07; G06T 7/11;
(Continued)

(56) References Cited

U.S. PATENT DOCUMENTS

2009/0303078 A1   12/2009   Mochizuki et al.
2014/0085545 A1*   3/2014   Tu .......................... G06F 18/254
                                                                            348/E9.047
(Continued)

FOREIGN PATENT DOCUMENTS

CN      109064495      12/2018
CN      109766769       5/2019
(Continued)

OTHER PUBLICATIONS

"Extended European Search Report", EP Application No. 21164367. 1, Sep. 15, 2021, 10 pages.

*Primary Examiner* — Wassim Mahrouka
(74) *Attorney, Agent, or Firm* — Harness, Dickey & Pierce, P.L.C.

(57) ABSTRACT

A method is provided for assigning a bounding box to an object in an environment of a vehicle. Data related to objects located in the environment of the vehicle are acquired via a sensor. Based on the data, a respective spatial location and a respective size of a plurality of preliminary bounding boxes are determined such that each preliminary bounding box covers one of the objects at least partly. A respective velocity of each preliminary bounding box is estimated based on the data. A subset of the plurality of preliminary bounding boxes being related to a respective one of the objects is selected, where the subset is selected based on the respective velocity of each of the preliminary bounding boxes. A final bounding box is assigned to the respective one of the objects by merging the preliminary bounding boxes of the corresponding subset.

18 Claims, 6 Drawing Sheets

(51) Int. Cl.
  *G06V 10/44* (2022.01)
  *G06V 10/762* (2022.01)
  *G06V 20/56* (2022.01)

(52) U.S. Cl.
  CPC ............ *G06V 10/762* (2022.01); *G06V 20/56* (2022.01); *G06T 2207/10044* (2013.01); *G06T 2207/30252* (2013.01); *G06V 2201/07* (2022.01)

(58) Field of Classification Search
  CPC . G06T 2207/10044; G06T 2207/30252; G01S 7/4802; G01S 7/415; G01S 13/589; G01S 2013/9323; G01S 13/726; G01S 13/931; G01S 17/931; G01S 7/417; G06N 3/08
  See application file for complete search history.

(56) References Cited

U.S. PATENT DOCUMENTS

| | | | | |
|---|---|---|---|---|
| 2018/0253848 | A1* | 9/2018 | Chen | G06T 7/11 |
| 2018/0286199 | A1* | 10/2018 | Chen | G06V 10/46 |
| 2019/0073553 | A1* | 3/2019 | Yao | G06N 3/082 |
| 2020/0082560 | A1* | 3/2020 | Nezhadarya | G06T 17/10 |

FOREIGN PATENT DOCUMENTS

| | | |
|---|---|---|
| CN | 109919072 | 6/2019 |
| CN | 111401148 | 7/2020 |
| WO | 2018085107 | 5/2018 |

\* cited by examiner

METHOD AND A DEVICE FOR ASSIGNING A BOUNDING BOX TO AN OBJECT

CROSS-REFERENCE TO RELATED APPLICATION(S)

This application claims priority to European Patent Application Number 21164367.1, filed Mar. 23, 2021, the disclosure of which is hereby incorporated by reference in its entirety herein.

BACKGROUND

For autonomous driving and driver assistance systems, a reliable perception of the environment of a vehicle is essential. In automotive perception systems, radar and Lidar sensors are commonly used nowadays since they are able to provide the shape and the distance of objects in the environment of the vehicle and since they are less affected by weather than e.g. camera systems.

Data captured by radar and Lidar sensors are usually provided in a so-called bird's eye view (BEV), e.g. in a manner as if looking from great height at a plane in which vehicle is currently moving. In bird's eye view, the size of objects is independent from their distance to the respective radar or Lidar sensor installed in the vehicle. However, the size of objects belonging to different types may have a great variance. For example, a pedestrian is much smaller than a car, and a car is usually much smaller than a truck or a bus.

When considering vehicles only, the number of cars is usually higher than the number of trucks or busses in the environment of a vehicle. Therefore, the size distribution of vehicles is mostly biased toward small vehicles. As a consequence, a perception system, which relies on machine learning or neural network and which is trained with such a biased size distribution of vehicles as a ground truth, tends to prefer small vehicles in that e.g. small bounding boxes are assigned to any type of vehicles. As a consequence, multiple small bounding boxes may be assigned to one large vehicle. The biased size distribution of the vehicle and the great variance regarding size may prevent that the perception system is able to provide a precise bounding box for large vehicles.

Data balancing has been proposed to solve this bias problem regarding the size of vehicles. That is, an object class of small vehicles may be down-sampled, while an object class of large vehicles may be over-sampled. Although some improvement could be achieved by this kind of data balancing, multiple small bounding boxes are still assigned to large vehicles in many cases.

Accordingly, there is a need to provide a method and a device that are able to assign a precise bounding box to an object regardless of object size.

SUMMARY

The present disclosure relates to a method and a device for assigning a bounding box to an object in an environment of a vehicle. The present disclosure provides a computer implemented method, a computer system and a non-transitory computer readable medium according to the independent claims. Embodiments are given in the subclaims, the description and the drawings.

In one aspect, the present disclosure is directed at a computer implemented method for assigning a bounding box to an object in an environment of a vehicle. According to the method, data related to objects, which are located in the environment of the vehicle, are acquired via a sensor. Based on the sensor data, a respective spatial location and a respective size of a plurality of preliminary bounding boxes are determined via a processing unit such that each preliminary bounding box covers one of the objects at least partly. A respective velocity of each preliminary bounding box is also estimated based on the sensor data via the processing unit. A subset of the plurality of preliminary bounding boxes being related to a respective one of the objects is selected via the processing unit, where selecting the subset depends on the respective velocity of each of the preliminary bounding boxes. A final bounding box is assigned to the respective one of the objects by merging the preliminary bounding boxes of the corresponding subset via the processing unit.

The method relies on the general idea that fast moving objects are unlikely to be close along their moving direction. Hence, based on the velocity of the respective objects the method is able to select the proper subset of preliminary bounding boxes, which in fact belong to a certain object. That is, different preliminary bounding boxes may be united for high velocity since it is more likely that they belong to the same object than belonging to two objects that have a close distance in moving direction. On the other hand, the preliminary bounding boxes belonging to two different objects may be separated for low velocity, e.g. a low respective velocity of the preliminary bounding boxes assigned to these objects.

The sensor may be a radar sensor and/or a Lidar sensor being installed in the vehicle and being able to monitor the environment, e.g. in front of the vehicle. For these sensors, the bounding boxes may be defined as rectangles in bird's eye view, e.g. as two-dimensional objects in a plane parallel to the ground on which the vehicle is currently moving and which is observed from large height. In this case, the bounding boxes may be defined via two vertices located at diagonally opposite corners of the rectangle representing the bounding box. Such two vertices may be positioned for setting the size and the orientation, e.g. the spatial location, of the bounding box in bird's eye view. In general, however, a bounding box may also be defined by a cuboid in three dimensions via a respective set of three vertices.

For determining the velocity of the respective preliminary bounding box, a sequence of data from the sensor may be used, e.g. a sequence of radar and/or Lidar scans. The velocity of the respective preliminary bounding box may be almost identical to the velocity of the respective object that is covered by the preliminary bounding box at least partly.

The spatial location and the size of each preliminary bounding box may be determined by a machine learning algorithm, e.g. a neural network. However, if such a machine learning algorithm is trained, a ground truth may be biased such that a larger number of smaller objects, e.g. cars, are included. Hence, the machine learning algorithm may output multiple small bounding boxes for one large object, e.g. a truck or a bus.

Based on the velocity of the preliminary bounding boxes and their spatial location, the method therefore examines whether more than one of the preliminary bounding boxes is related to one object such that the preliminary bounding boxes belonging to a certain subset of bounding boxes related to the object need to be merged in order to generate the final bounding box that properly covers e.g. a large object. Conversely, the subset of the preliminary bounding boxes may also consist of one box only. In this case the method simply maintains this box as a final bounding box. Hence, the method according to the disclosure is able to provide proper bounding boxes for objects regardless of their size. That is, a truck or a bus may be covered properly by a single final bounding box generated by the method according to the disclosure.

The method may comprise one or more of the following features:

A direction of the velocity may be determined for each preliminary bounding box, and a respective size-modified box may be generated for each preliminary bounding box by shrinking the preliminary bounding box in the direction of the velocity and in a lateral direction perpendicularly to the direction of the velocity, and by extending the preliminary bounding box in the direction of the velocity, where extending the preliminary bounding box depends on the absolute value of the velocity estimated for the preliminary bounding box. The preliminary bounding boxes having overlapping size-modified boxes may be selected for the respective subset.

For shrinking the preliminary bounding box, a length and a width of the respective preliminary bounding box may be reduced by the same factor. For extending the preliminary bounding box, a length of the respective preliminary bounding box in the direction of the velocity may be multiplied by the absolute value of the velocity and by an extend factor.

For selecting the subset of the plurality of preliminary bounding boxes, a maximal connected subgraph algorithm may be applied to all preliminary bounding boxes. Two size-modified boxes may be regarded as overlapping if their intersection over union is greater than a predefined threshold.

A centroid may be estimated for the preliminary bounding boxes of a respective subset, and farthest vertices having the greatest distance to the centroid may be determined for the preliminary bounding boxes of the subset. The final bounding box may be determined based on the farthest vertices.

A velocity of the final bounding box may be determined by averaging the estimated velocities over the corresponding subset of preliminary bounding boxes. An attribute may be determined for each of the preliminary bounding boxes, and based on the attribute, it may be decided whether a selected preliminary bounding box may be excluded from the corresponding subset. A probability distribution may be assigned to values of the attribute of the preliminary bounding boxes belonging to a respective subset, and the selected preliminary bounding box may be excluded from the corresponding subset if the probability assigned to the value of the attribute of the selected preliminary bounding box is smaller than a predetermined threshold. A machine learning algorithm may be applied to the sensor data for determining the spatial location and the size of each preliminary bounding box.

According to an embodiment, a direction of the velocity may be determined for each preliminary bounding box. A respective box, which is modified regarding its size, may be generated for each preliminary bounding box by shrinking the preliminary bounding box in the direction of the velocity and in a lateral direction perpendicularly to the direction of the velocity, and by extending the preliminary bounding box in the direction of the velocity, where extending the preliminary bounding box may depend on the absolute value of the velocity estimated for the respective preliminary bounding box. The preliminary bounding boxes having overlapping size-modified boxes may be selected for the respective subset in order to generate the final bounding box for the respective object.

For this embodiment, a shrink step and an extend step may be applied to each preliminary bounding box for clustering preliminary bounding boxes belonging to a respective object via their overlapping size-modified boxes. Since the shrink step is independent from the velocity and affects the length and the width of a preliminary bounding box, the shrink step may separate size-modified boxes and therefore preliminary bounding boxes that belong to different objects. In addition, the shrink step may separate preliminary bounding boxes in the direction of the velocity and in the lateral direction as well.

In contrast, the extend step may affect the preliminary bounding box in the direction of the velocity only. Therefore, different subsets of preliminary bounding boxes may be united in the direction of the velocity only, but not perpendicularly in lateral direction. Since the extend step depends on the velocity, it also depends on the velocity whether the respective preliminary bounding box is shrinked or extended in the direction of the velocity in order to generate the respective size-modified box. For low velocities, the shrink step may prevail such that the method may be inclined to separate the size-modified boxes at low velocity, and therefore to separate e.g. two different sets of preliminary bounding boxes. On the other hand, for high velocities the extend step may prevail such that the preliminary bounding boxes may be merged in the direction of the velocity for fast moving objects, e.g. in a highway scenario. For such fast moving objects, it may be quite unlikely that they are moving close to each other in the direction of their velocities. Conversely, it may be quite likely that different preliminary bounding boxes being located close to each other in the direction of the velocity may belong in fact to the same object and may therefore to be merged.

Due to the shrink step and the extend step of the preliminary bounding boxes, the reliability of the final bounding boxes may be improved since preliminary bounding boxes belonging to two different objects may be separated via the shrink step, whereas preliminary bounding boxes belonging to the same object may be united in one subset due to the extend step. Since the extend step depends on the velocity only, the decision whether a certain group of preliminary bounding boxes is united to one subset or separated into two subsets may also depend on the velocity.

For shrink the preliminary bounding box, a length and a width of a respective preliminary bounding box may be reduced by the same factor. By this means, a biasing regarding the direction may be avoided when the preliminary bounding boxes may be separated into different subsets via the shrink step.

For extending the preliminary bounding box, a length of the respective preliminary bounding box in the direction of the velocity may be multiplied by the absolute value of the velocity and by an extend factor. Such a multiplication of different factors may be a straightforward means for implementing the extend step. In addition, weighting between extend and shrink steps may be controlled by defining a suitable extend factor.

For selecting the subset of the plurality of preliminary bounding boxes, a maximal connected subgraph algorithm may be applied to all preliminary bounding boxes. Two size-modified boxes may be regarded as overlapping if their intersection over a union is greater than a predefined threshold. These means for selecting the subset and for checking the overlap of size-modified boxes may again improve the reliability of the final bounding boxes while requiring a reasonable computational effort.

According to a further embodiment, a centroid may be estimated for the preliminary bounding boxes of a respective subset, and farthest vertices having the greatest distance to the centroid may be determined for the preliminary bounding boxes of the subset. The final bounding box related to this subset may be determined based on the farthest vertices. If the bounding boxes are represented by rectangles in bird's eye view, two farthest vertices may be sufficient for determining the final bounding box for the respective subset. Hence, determining the farthest vertices may be a straightforward procedure for merging the preliminary bounding boxes of the respective subset in order to generate the respective final bounding box. Such a merging procedure may require a low computational effort.

A velocity of the final bounding box and therefore of the object assigned to this final bounding box may be determined by averaging the estimated velocities over the corresponding subset of preliminary bounding boxes. Hence, further attributes of the final bounding box, e.g. in addition to its size and spatial location, may be determined by simply averaging this attribute over all relevant preliminary bounding boxes belonging to the respective object.

According to a further embodiment, an attribute may be determined for each of the preliminary bounding boxes, and based on this attribute, it may be decided whether a selected preliminary bounding box may be excluded from the corresponding subset. In other words, a preliminary bounding box, which has already been selected for a respective subset, may be regarded as an outlier by considering the attribute of the preliminary bounding boxes, and such an outlier may be removed from the relevant subset of preliminary bounding boxes. The attribute may be a size, an orientation or the velocity of the respective preliminary bounding box. For example, it may be determined whether the size or the orientation of a certain preliminary bounding box differs too much from the size or the orientation of all further preliminary bounding boxes belonging to the same subset. By excluding a preliminary bounding box that has been identified as an outlier, the reliability of the final bounding boxes and therefore the reliability of the entire method may further be improved.

In detail, a probability distribution may be assigned to values of the attribute of the preliminary bounding boxes belonging to a respective subset, and the selected preliminary bounding box may be excluded from the corresponding subset if the probability assigned to the value of this attribute of the selected preliminary bounding box is smaller than a predetermined threshold. Via the probability distribution and the predetermined threshold, clear criteria may be defined for deciding whether a certain preliminary bounding box is an outlier or not. Hence, the reliability of the method may further be improved.

Furthermore, a machine learning algorithm may be applied to the sensor data for determining the spatial location and the size of each preliminary bounding box. Such a machine learning algorithm may provide a robust basis for the further method steps of determining the final bounding boxes.

In another aspect, the present disclosure is directed at a device for assigning a bounding box to an object in an environment of a vehicle. The device comprises a sensor and a processing unit. The sensor is configured to acquire data related to objects that are located in the environment of the vehicle. The processing unit is configured to determine, based on the sensor data, a respective spatial location and a respective size of a plurality of preliminary bounding boxes such that each preliminary bounding box covers one of the objects at least partly, to estimate a respective velocity of each preliminary bounding box based on the sensor data, to select a subset of the plurality of preliminary bounding boxes being related to a respective one of the objects, where selecting the subset depends on the respective velocity of each of the preliminary bounding boxes, and to assign a final bounding box to the respective one of the objects by merging the preliminary bounding boxes of the corresponding subset.

As used herein, the terms processing device, processing unit and module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the device according to the disclosure includes a sensor and a processing unit, which are configured to perform the steps as described above for the corresponding method. Therefore, the benefits, the advantages and the disclosure as described above for the method are also valid for the device according to the disclosure.

According to an embodiment, the sensor may include a radar sensor and/or a Lidar sensor. Data provided by these sensors may be suitable for determining the velocity of preliminary bounding boxes in addition to their size and spatial location.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
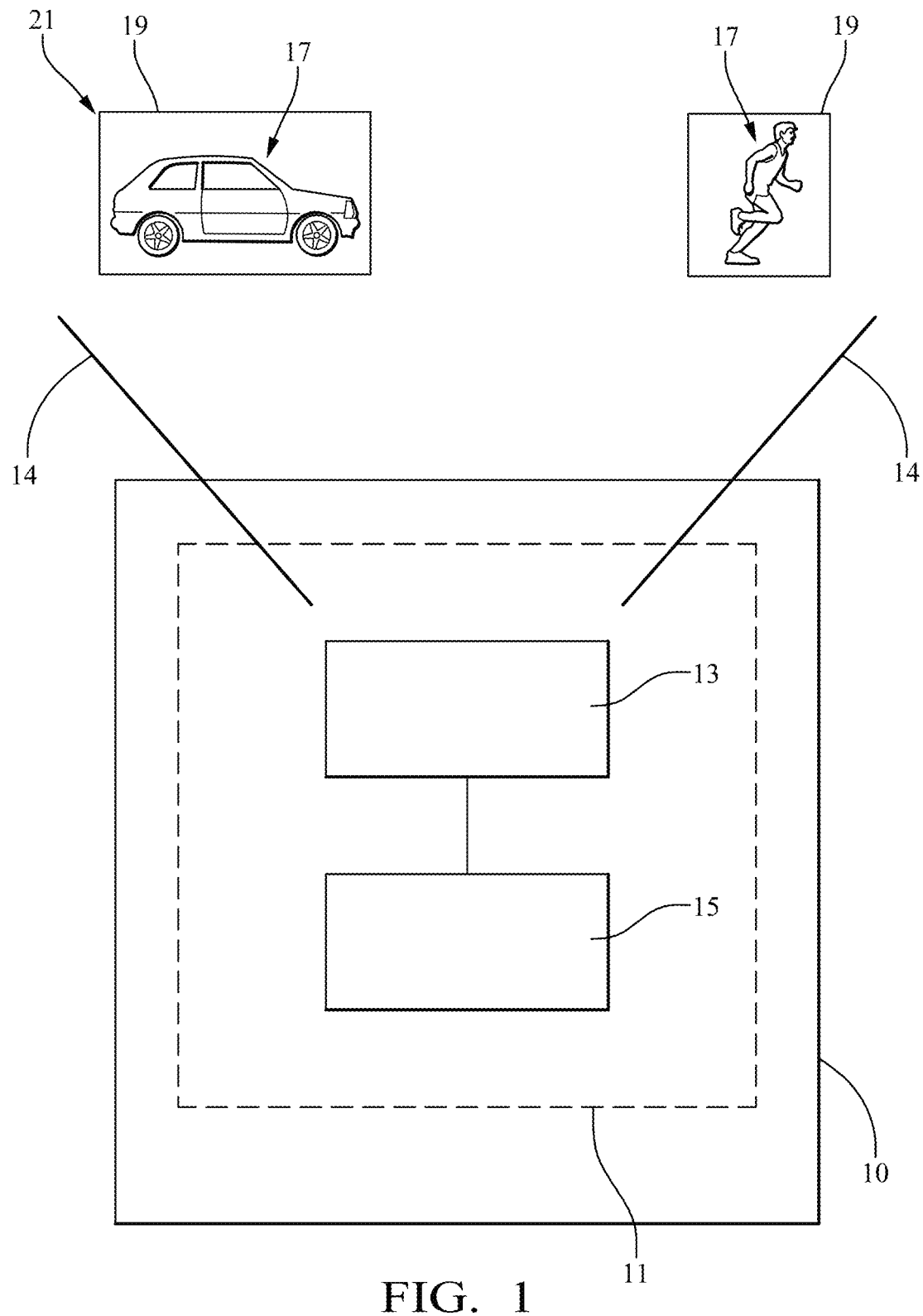
FIG. 1 depicts an overview of a device according to the disclosure.

FIG. 1 depicts a schematic overview of a device 11 according to the disclosure. In aspects, the device is installed in a vehicle 10. The device 11 includes a sensor 13 having an instrumental field of view 14 and a processing unit 15.

The sensor 13 is a radar sensor and/or a Lidar sensor and is configured for monitoring the environment of the vehicle 10. That is, the sensor 13 is configured to provide data related to objects 17, which are located in the environment of the vehicle 10. The data provided by the sensor 13 are transferred to the processing unit 15 that is configured to generate a respective bounding box 19 related to each object 17.

It is noted that the objects 17 are depicted in FIG. 1 in a sideview for illustration purposes only. Actually, the data provided by the radar sensor and/or Lidar sensor 13 are presented in bird's eye view, e.g. from a perspective when looking from a large height at the vehicle 10 and the objects 17 including their bounding boxes 19. In bird's eye view, the bounding boxes 19 are rectangles for each of which the spatial location is uniquely defined by a pair of vertices 21 that are positioned diagonally opposite to each other.

Figure 2:
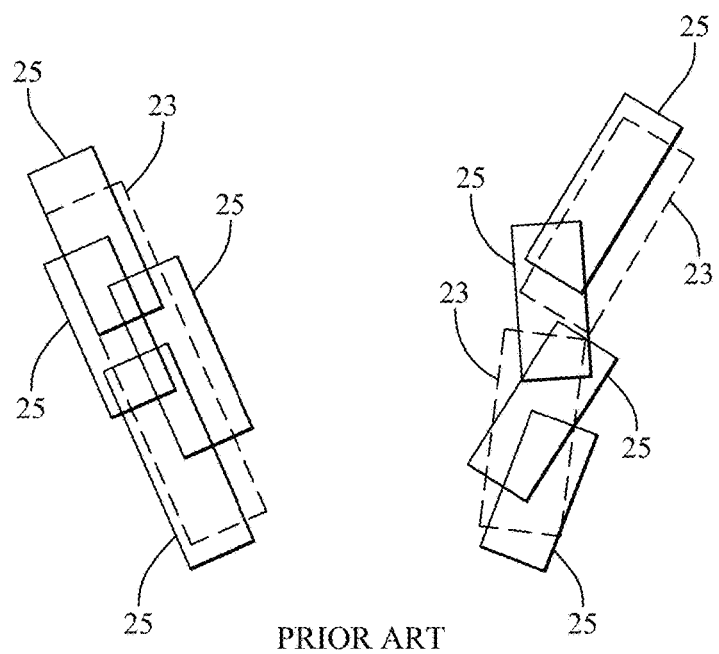
FIG. 2 depicts an example for predicting bounding boxes according to the background art.

FIG. 2 depicts an example for predicting bounding boxes for large vehicles via a perception system according to the background art. The ground truth for the respective bounding boxes is denoted by 23 and illustrated by dashed lines. On the left side of FIG. 2, the dashed rectangle 23 represents the ground truth for a truck, whereas on the right side of FIG. 2, the two dashed rectangles 23 represent the ground truth, e.g. the rectangles that are to be predicted, for a bendy bus.

Usually, a conventional perception system is based on a machine learning algorithm trained by a ground truth comprising a majority of small vehicles, e.g. cars since the number of cars is usually much higher in a typical environment of the vehicle 10 than the number of trucks and busses. As a consequence, the conventional perception system predicts a plurality of small bounding boxes 25, each of which covers the ground truth for the bendy bus only partly. As can be seen in FIG. 2, each of the plurality of predicted bounding boxes 25 has a bad quality in comparison to the ground truth 23, where the bendy bus on the right side of FIG. 2 is even more difficult to predict. Some of the predicted bounding boxes 25 have an orientation that does not fit at all to the orientation of the ground truth rectangles 23.

Although each single predicted bounding box 25 has a bad quality when compared with the ground truth 23, the entire set of predicted bounding boxes 25 is able to cover the ground truth 23 much better. This is a motivation for one of the principles according to the present disclosure, e.g. merging a certain number of small bounding boxes 25 in order to generate one big bounding box.

Figure 3:
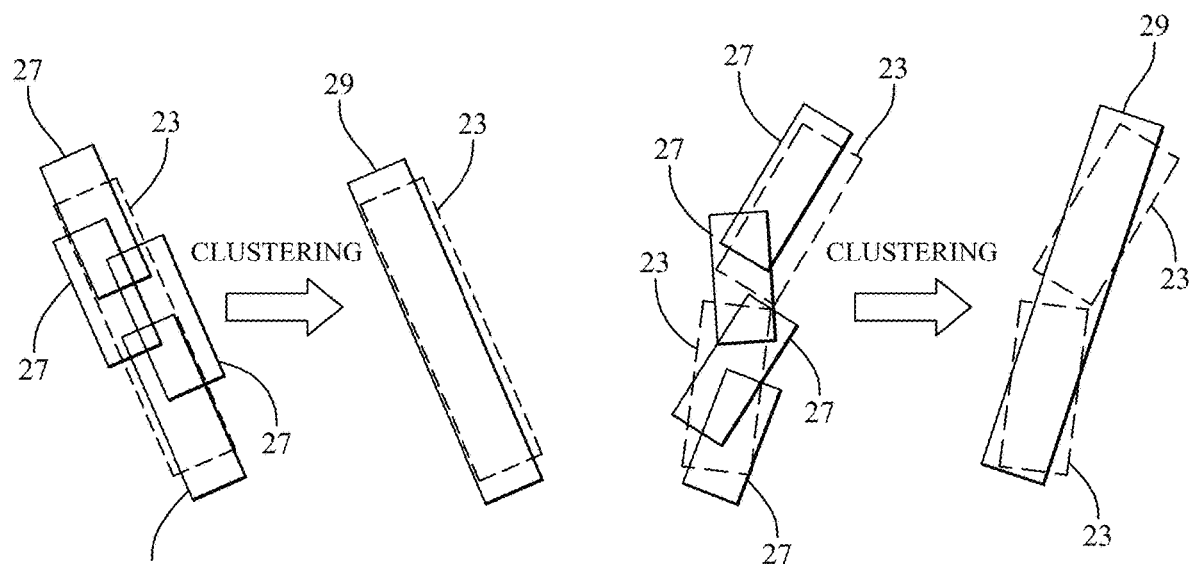
FIG. 3 depicts an example for clustering bounding boxes according to the disclosure.

This is illustrated in FIG. 3. The same ground truth 23 for a truck and for a bendy bus, respectively, is shown two times by dashed lines. On the respective left side, preliminary bounding boxes 27 are depicted, which correspond to the bounding boxes 25 as shown in FIG. 2 and which represent the output of a perception system according to the background art. That is, the preliminary bounding boxes 27 are the output of a machine learning algorithm, which has been trained with a ground truth including mostly smaller vehicles like cars.

Based on the group of preliminary bounding boxes 27, a final bounding box 29 is generated, which is shown on the respective right side in FIG. 3. In order to generate the final bounding boxes 29, the so-called maximal connected subgraph algorithm is applied to the entirety of preliminary bounding box 27, which are identified within the instrumental field of view 14 of the sensor 13 (see FIG. 1). Via this algorithm, clusters or subsets of preliminary bounding boxes 27 are identified that are assumed to belong to a certain object 17. If the truck and the bendy bus, which generate the ground truth 23 in FIGS. 2 and 3, were located in the same field of view 14 of the sensor 13, the maximal connected subgraph algorithm would generate two subsets or clusters of preliminary bounding boxes 27 for each of these objects 17, e.g. for the truck and for the bendy bus in the examples of FIGS. 2 and 3.

In the maximal connected subgraph algorithm, one important step is the computation of a so-called adjacency matrix, which represents the similarity between every pair of preliminary bounding boxes 27. The intersection over union (IoU), which is known in the art, is used as a measure for the similarity of two preliminary bounding boxes 27. Usually, a threshold is defined for the intersection over union in order to decide whether two objects, e.g. two preliminary bounding boxes 27, belong together or not. For the present case, e.g. for a plurality of preliminary bounding boxes 27, it is not easy to define a general threshold, as will be explained in detail below. One reason is that one big object has to be distinguished from two or more smaller objects, which are located closely to each other, e.g. having a small gap between them only such that the preliminary bounding boxes 27 overlap for both objects. After defining the clusters or subsets of the preliminary bounding boxes 27, which belong to a certain object 17 in the environment of the vehicle 10 (see FIG. 1), the final bounding boxes 29 are generated by determining farthest vertices 39 (see FIG. 7) for the respective cluster or subset of preliminary bounding boxes 27. This will also be explained in detail below.

Figure 4A:
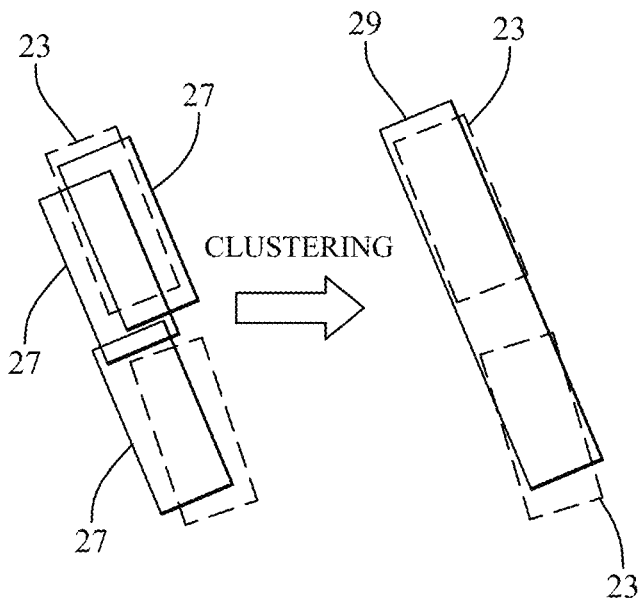
FIGS. 4A, 4B, and 4C depict challenging scenarios for clustering bounding boxes.
Figure 4B:
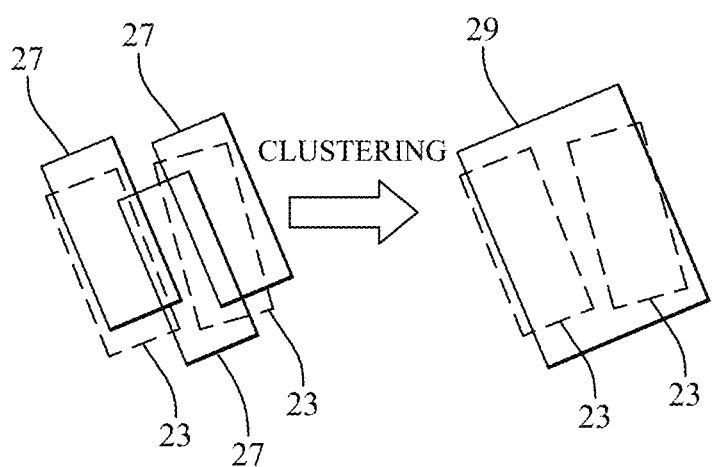

Challenging scenarios for generating a proper final bounding box 29 are depicted in FIG. 4. In FIGS. 4A and 4B, the ground truth 23 (illustrated by dashed lines) includes the bounding boxes for two different smaller vehicles that are located close to each other in driving direction (FIG. 4A) and in lateral direction (FIG. 4B), respectively. In both cases, the preliminary bounding boxes 27 overlap for the two objects of the ground truth 23. As a consequence, the entire subset of preliminary bounding boxes 27 is regarded as one big cluster, and therefore one single big final bounding box 29 is generated. That is, the perception system is unable to resolve the two objects represented by the ground truth 23 for the examples in FIGS. 4A and 4B.

Figure 4C:
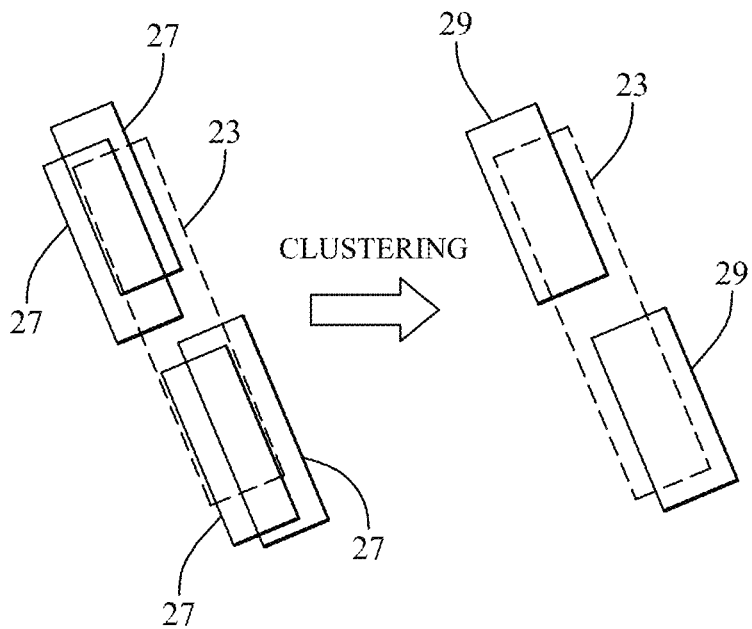

In the example of FIG. 4C, the predicted or preliminary bounding boxes 27 are not connected to each other in the middle of the subgraph. This might be caused by a low spatial resolution of the sensor 13, e.g. the radar sensor and/or the Lidar sensor (see FIG. 1). As a consequence, the preliminary bounding boxes 27 as shown in FIG. 4B is separated into two clusters or subsets although the ground truth 23 represents one big vehicle, e.g. a truck. Hence, two final bounding boxes 29 are generated in the example of FIG. 4C suggesting that two objects are present although the ground truth 23 represents one big object.

In order to overcome such concerns, the device 11 and a method according to the disclosure additionally consider the respective velocity of assumed objects that is reflected in the respective velocity of the preliminary bounding boxes 27. Generally, the velocity of the object 17 (see FIG. 1) can also be determined based on the data of the sensor 13, e.g. based on a sequence of radar and/or Lidar scans. Accordingly, a respective velocity is assigned to each of the preliminary bounding boxes 27, which are located in the region of the respective object 17.

Figure 5A:
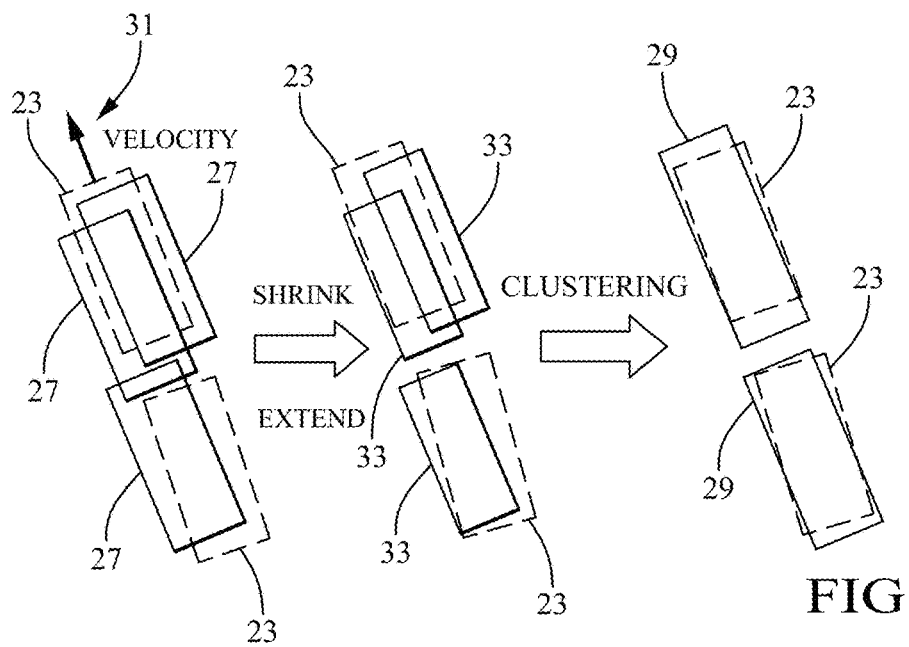
FIGS. 5A, 5B, and 5C depict schemes for separating and merging bounding boxes according to the disclosure.
Figure 5B:
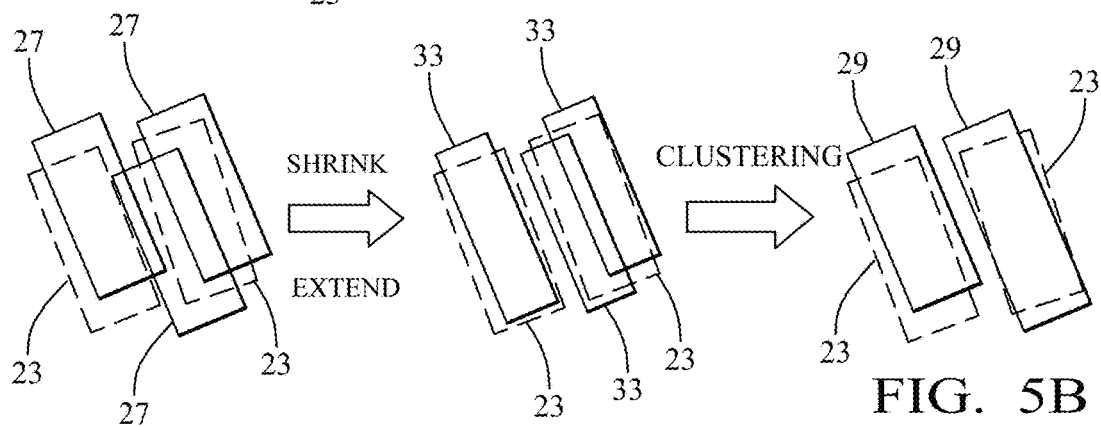
Figure 5C:
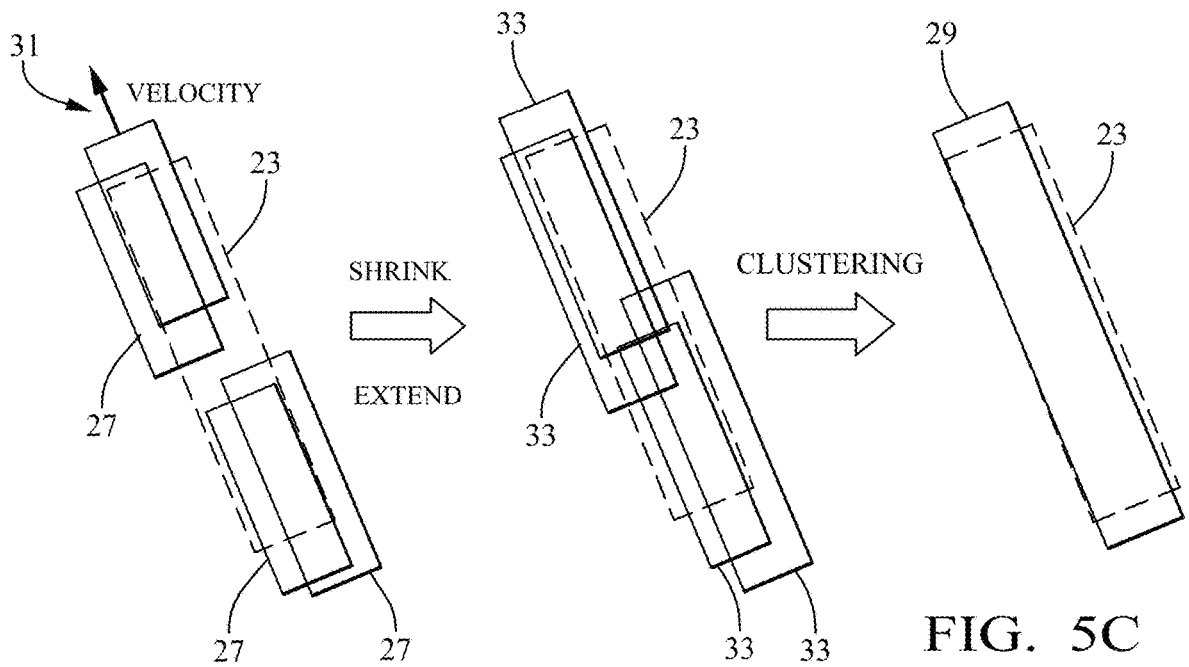

Along the moving direction of the objects 17, e.g. along the direction of their velocity vector, it is quite unlikely for two fast moving vehicle that they are close to each other. In other words, it is more likely that preliminary bounding boxes 27, which are close to each other in the moving direction of an object, belong to one big object even if the preliminary bounding boxes do not overlap (as shown in FIG. 4C and FIG. 5C in the left subgraph). In contrast, in a lateral direction perpendicular to the moving direction of one or more vehicles, it is more likely that preliminary bounding boxes 27 belong to different objects although the preliminary bounding boxes may overlap (as shown in FIG. 4B and FIG. 5B in the respective left subgraph).

In order to consider the velocity of objects when generating bounding boxes, a shrink step and an extend step are applied to the preliminary bounding boxes 27. The shrink step is performed in moving direction and in lateral direction, whereas the extend step is performed along the moving direction only.

Before performing the shrink step and the extend step, a respective velocity vector 31 is estimated for each preliminary bounding box 27 based on the data from the sensor 13 (see FIG. 1). Examples for the velocity vector 31 are shown in FIG. 5. For FIG. 5A and FIG. 5B, it is assumed that the velocity vector 31 has a small absolute value, whereas for the example of FIG. 5C, the absolute value of the velocity vector 31 is assumed to be much larger than the absolute value of the velocity vector 31 of FIGS. 5A and 5B. The shrink step and the extend step of the respective preliminary bounding box 27 are defined as follows:

Shrink step: $L=L*\text{shrink factor}, W=W*\text{shrink factor}$;

Extend step: $L=L*\text{velocity}*\text{extend factor}$

L and W denote the length and the width of the respective preliminary bounding box 27, e.g. in longitudinal or moving direction and in lateral direction, respectively. The shrink factor is a number between 0 and 1. In the formula of the extend step, the term "velocity" denotes the absolute value of the respective velocity vector 31. The product of the velocity and the extend factor is a number greater than 1.

The shrink factor and the extend factor may be suitably defined during a training procedure for the entire device 11. That is, both factors are determined empirically by applying the device 11 and the method to realistic scenarios for which the device 11 and the method are intended to be used.

For the examples as shown in FIGS. 5A and 5B, the preliminary bounding boxes 27 as shown in the left subgraph are first shrinked in the moving direction, e.g. along the velocity vector 31, and in the lateral direction, e.g. perpendicularly to the velocity vector 31, by the same shrink factor. Thereafter, the preliminary bounding boxes 27 are extended in moving direction along the velocity vector 31 only, where the extend factor is multiplied by the absolute value of the velocity vector 31. As a result of the shrink step and the extend step, size-modified boxes 33 are generated, which are shown in the middle subgraph of FIGS. 5A, 5B and 5C. Based on the size-modified boxes 33, it is decided which of the preliminary bounding boxes 27 form a respective subset that is related to a certain assumed object.

In the examples as shown in FIGS. 5A and 5B, the plurality of preliminary bounding boxes 27 as shown in the respective left subgraph separates into two different subsets of size-modified boxes 33 as can be recognized in the middle subgraph. Due to the low absolute value of the velocity vector 31 for the examples of FIGS. 5A and 5B, the shrink step prevails over the extend step since the extend step depends on the absolute value of the velocity vector 31 and the shrink step is independent from the velocity. Due to the prevalence of the shrink step, the two different objects represented by the ground truth 23 (illustrated by dashed lines) can be resolved by the device 11 and the method, and final bounding boxes 29 can be assigned to the objects that cover these two objects properly.

In contrast, for the example as shown in FIG. 5C, the absolute value of the velocity vector 31 is assumed to be much larger, and therefore the extend step prevails over the shrink step. Although the preliminary bounding boxes 27 do not overlap in the middle of the subgraph as shown on the left side in FIG. 5C, the prevalence of the extend step leads to size-modified boxes 33 that overlap for the entire subset. In other words, there is no separation for the size-modified boxes 33 anymore, which was present for the preliminary bounding boxes 27. As a result, one final bounding box 29 is generated for the example as shown in FIG. 5C only which properly covers the ground truth 23 (illustrated by dashed lines), e.g. one large object like a truck.

It is noted that the size-modified boxes 33 in the middle subgraphs of FIG. 5 are used for identifying those preliminary bounding boxes 27 only which have to be grouped in a certain subset. A preliminary bounding box 27 is selected for a certain subset and assumed to belong to a certain object if the corresponding size-modified box 33 overlaps with further size-modified boxes 33 belonging to the same subset. In other words, preliminary bounding boxes 27 are grouped in a subset for generating one of the final bounding boxes 29 if their size-modified boxes 33 overlap at least partly. The size-modified boxes 33 are therefore used for the decision of which of the preliminary bounding boxes 27 belong to a certain subset, and they are not used for generating the final bounding boxes 29. Instead, the preliminary bounding boxes 27 of an identified subset are still used for generating the respective final bounding box 29, as will be explained below in context of FIG. 7.

Figure 6A:
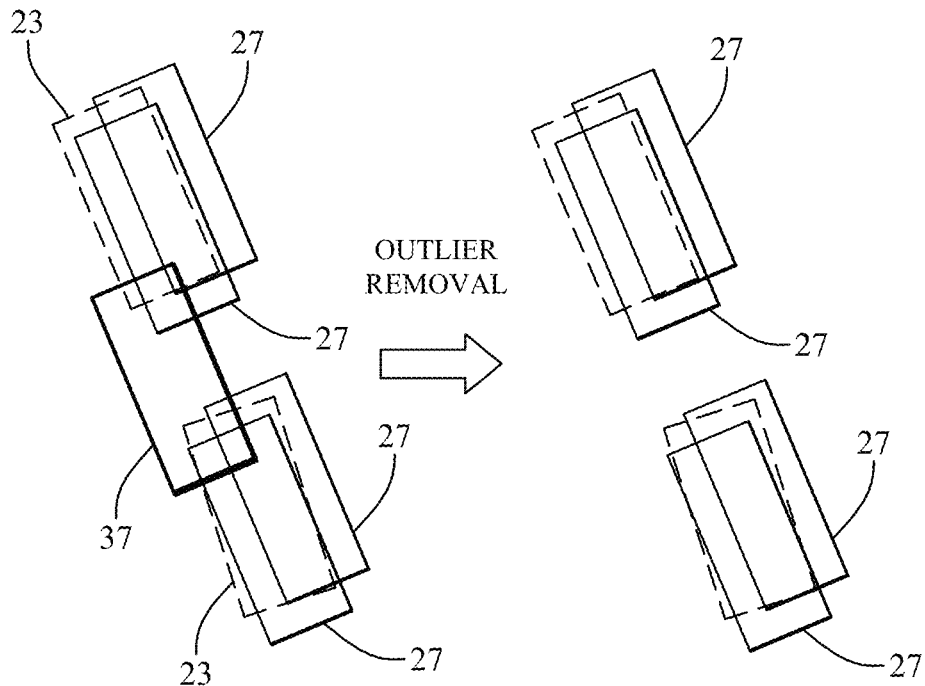
FIGS. 6A and 6B depict examples for removing outliers from a group of bounding boxes.
Figure 6B:
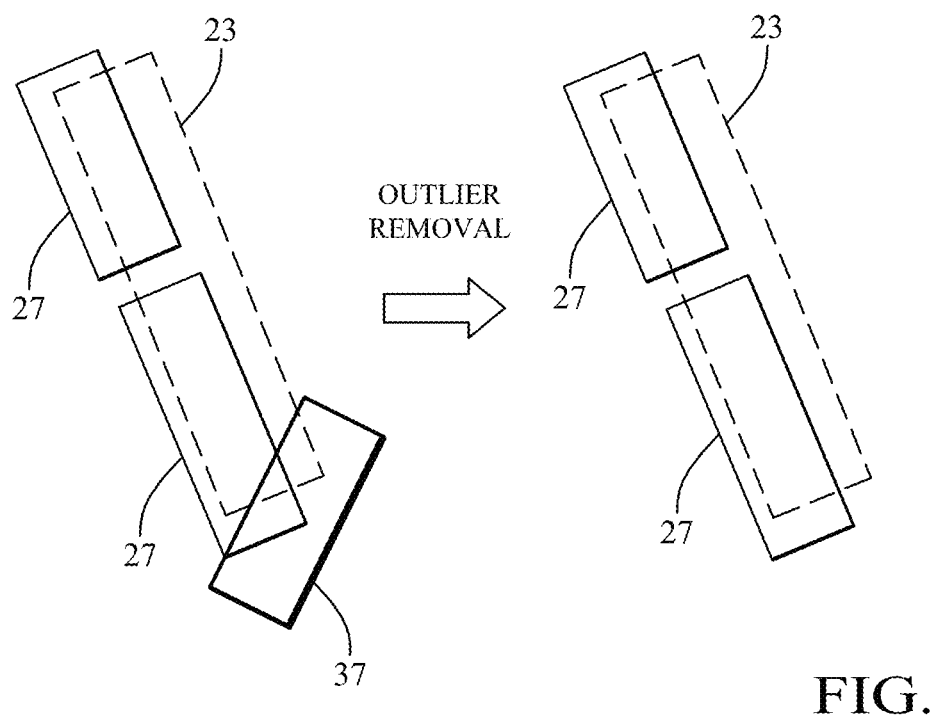

The scheme for determining proper final bounding boxes 29 as described so far might be deteriorated by outliers of the prediction of the preliminary bounding boxes 27. in FIG. 6, two examples for such outliers are illustrated as outlier boxes 37. In the example of FIG. 6A, the outlier box 37 erroneously connects two groups of preliminary bounding boxes 27, which actually belong to two different objects represented by the respective ground truth 23 (illustrated by dashed lines). In the example of FIG. 6B, the outlier box 37 has an exceptional orientation in comparison to the further preliminary bounding boxes 27 related to the same object.

Therefore, an additional outlier removal procedure is applied to the preliminary bounding boxes 27, which are the result of the original prediction. For the outlier removal, the respective distribution is modeled for the attributes of the preliminary bounding boxes, where these attributes include the size, the orientation and/or the velocity of the preliminary bounding boxes 27. That is, based on values for these attributes, a probability distribution is modeled. Thereafter, a probability value can be assigned to each attribute of each preliminary bounding box 27. If the respective probability value of at least one of the attributes of a certain preliminary bounding box 27 is lower than a predetermined threshold, the corresponding preliminary bounding box 27 is considered as an outlier box 37. The outlier boxes 37 are excluded from any subset selection and are therefore not considered for determining the final bounding boxes 29.

Figure 7:
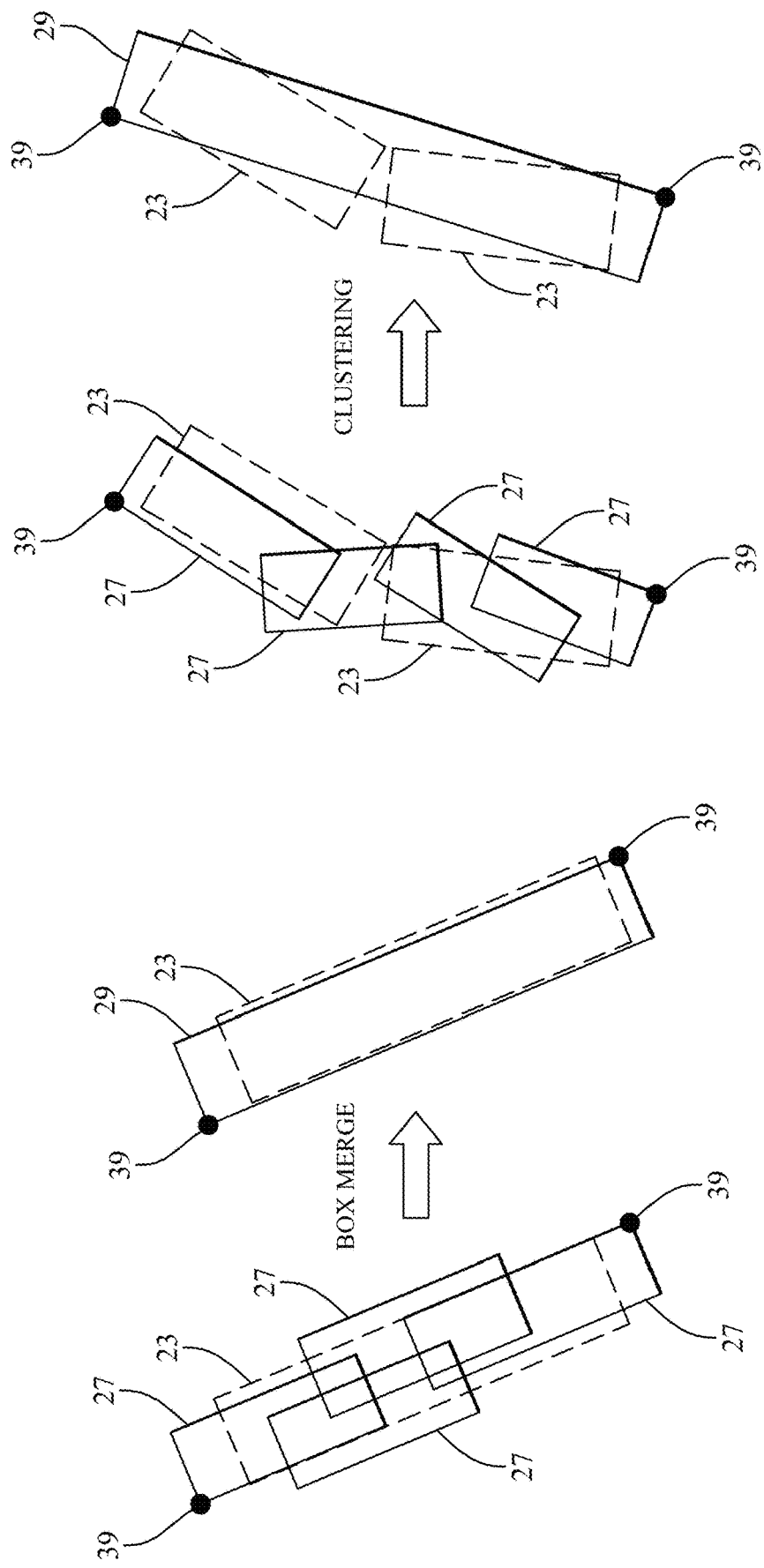
FIG. 7 depicts a scheme for merging bounding boxes via farthest vertices.

When all clusters or subsets of preliminary bounding boxes 27 are identified, the preliminary bounding boxes 27 belonging to the respective cluster or subset are merged as is schematically illustrated in FIG. 7. For merging the subset of preliminary bounding boxes 27, the vertices 21 (see also FIG. 1) of the preliminary bounding boxes 27 are considered. Since the bounding boxes are represented as rectangles, each preliminary bounding box 27 includes four vertices 21.

In order to merge a subset of preliminary bounding boxes 27, so-called farthest vertices 39 are identified for each subset. The farthest vertices 39 have the largest distances, e.g. a larger distance than the further vertices 21, with respect to a centroid of the entire subset of preliminary bounding boxes 27. In the examples of FIG. 7, two farthest vertices 39 are sufficient for identifying the vertices of the respective final bounding box 29.

In addition, further attributes of the final bounding box 29 can be determined as an average over all preliminary bounding boxes 27 belonging to the subset that has been used for generating the final bounding box 29. For example, the velocity vector of the final bounding box 29 is determined as an average of all velocity vectors 31 determined for the preliminary bounding boxes 27, which have been used for generating the final bounding box 29.

What is claimed is:

1. A computer implemented method comprising:
   acquiring, via a sensor, sensor data related to objects located in an environment of a vehicle;
   determining, via a processing unit and based on the sensor data, a respective spatial location and a respective size of a plurality of preliminary bounding boxes such that each preliminary bounding box covers one of the objects at least partly;
   estimating a respective velocity of each preliminary bounding box based on the sensor data;
   selecting a subset of the plurality of preliminary bounding boxes that are related to a respective one of the objects, the subset selected based on the respective velocity of each of the preliminary bounding boxes; and
   assigning a final bounding box to the respective one of the objects by merging the preliminary bounding boxes included in the subset,
   wherein:
   a direction of the velocity is determined for each preliminary bounding box;
   a respective size-modified box is generated for each preliminary bounding box by:
   shrinking the preliminary bounding box in the direction of the velocity and in a lateral direction perpendicularly to the direction of the velocity; and
   extending the preliminary bounding box in the direction of the velocity based on an absolute value of the velocity estimated for the preliminary bounding box; and
   preliminary bounding boxes having overlapping size-modified boxes are selected for the respective subset.

2. The method according to claim 1, wherein the shrinking of the preliminary bounding box includes reducing a length and a width of the respective preliminary bounding box by a same factor.

3. The method according to claim 1, wherein the extending of the preliminary bounding box includes multiplying a length of the respective preliminary bounding box in the direction of the velocity by the absolute value of the velocity and by an extend factor.

4. The method according to claim 1, wherein selecting the subset of the plurality of preliminary bounding boxes includes applying a maximal connected subgraph algorithm to all preliminary bounding boxes of the plurality of preliminary bounding boxes.

5. The method according to claim 1, wherein two of the size-modified boxes are regarded as overlapping if their intersection over union is greater than a predefined threshold.

6. The method according to claim 1, wherein:
   a centroid is estimated for the preliminary bounding boxes of a respective subset;
   farthest vertices having a greatest distance to the centroid are determined for the preliminary bounding boxes of the subset; and
   the final bounding box is determined based on the farthest vertices.

7. The method according to claim 1, wherein a velocity of the final bounding box is determined by averaging estimated velocities over a corresponding subset of preliminary bounding boxes.

8. The method according to claim 1, further comprising:
   determining an attribute for each of the preliminary bounding boxes; and
   based on the attribute, determining whether a selected preliminary bounding box is excluded from the corresponding subset.

9. The method according to claim 8, wherein:
   a probability distribution is assigned to values of the attribute of the preliminary bounding boxes belonging to a respective subset; and
   the selected preliminary bounding box is excluded from the corresponding subset if a probability assigned to the value of the attribute of the selected preliminary bounding box is smaller than a predetermined threshold.

10. The method according to claim 1, wherein a machine learning algorithm is applied to the sensor data for determining the spatial location and the size of each preliminary bounding box.

11. A device comprising:
    a sensor configured to acquire sensor data related to objects located in an environment of a vehicle; and
    a processing unit configured to:
    determine, based on the sensor data, a respective spatial location and a respective size of a plurality of preliminary bounding boxes such that each preliminary bounding box covers one of the objects at least partly;
    estimate a respective velocity of each preliminary bounding box based on the sensor data;
    select a subset of the plurality of preliminary bounding boxes being related to a respective one of the objects, the subset selected based on the respective velocity of each of the preliminary bounding boxes; and
    assign a final bounding box to the respective one of the objects by merging the preliminary bounding boxes included in the subset,
    wherein:

a direction of the velocity is determined for each preliminary bounding box;

a respective size-modified box is generated for each preliminary bounding box by:

shrinking the preliminary bounding box in the direction of the velocity and in a lateral direction perpendicularly to the direction of the velocity; and extending the preliminary bounding box in the direction of the velocity based on an absolute value of the velocity estimated for the preliminary bounding box; and preliminary bounding boxes having overlapping size-modified boxes are selected for the respective subset.

12. The device according to claim 11, wherein the sensor includes at least one of a radar sensor or a Lidar sensor.

13. The device according to claim 11, wherein the processing unit is configured to shrink preliminary bounding box by reducing a length and a width of the respective preliminary bounding box by a same factor.

14. The device according to claim 11, wherein the processing unit is configured to extend the preliminary bounding box by multiplying a length of the respective preliminary bounding box in the direction of the velocity by the absolute value of the velocity and by an extend factor.

15. The device according to claim 11, wherein the processing unit is configured to select the subset of the plurality of preliminary bounding boxes includes applying a maximal connected subgraph algorithm to all preliminary bounding boxes of the plurality of preliminary bounding boxes.

16. The device according to claim 11, wherein two of the size-modified boxes are regarded as overlapping if their intersection over union is greater than a predefined threshold.

17. The device according to claim 11, wherein the processing unit is configured to:

estimate a centroid for the preliminary bounding boxes of a respective subset;

determine farthest vertices having a greatest distance to the centroid for the preliminary bounding boxes of the subset; and determine the final bounding box based on the farthest vertices.

18. Non-transitory computer readable medium comprising instructions that, when executed by a processor, cause the processor to perform operations including:

determining, based on sensor data acquired by a sensor and related to objects located in an environment of a vehicle, a respective spatial location and a respective size of a plurality of preliminary bounding boxes such that each preliminary bounding box covers one of the objects at least partly;

estimating a respective velocity of each preliminary bounding box based on the sensor data;

selecting a subset of the plurality of preliminary bounding boxes that are related to a respective one of the objects, the subset selected based on the respective velocity of each of the preliminary bounding boxes; and assigning a final bounding box to the respective one of the objects by merging the preliminary bounding boxes included the subset, wherein:

a direction of the velocity is determined for each preliminary bounding box;

a respective size-modified box is generated for each preliminary bounding box by:

shrinking the preliminary bounding box in the direction of the velocity and in a lateral direction perpendicularly to the direction of the velocity; and extending the preliminary bounding box in the direction of the velocity based on an absolute value of the velocity estimated for the preliminary bounding box; and preliminary bounding boxes having overlapping size-modified boxes are selected for the respective subset.

* * * * *